INVENTOR
William P. McIlvanie

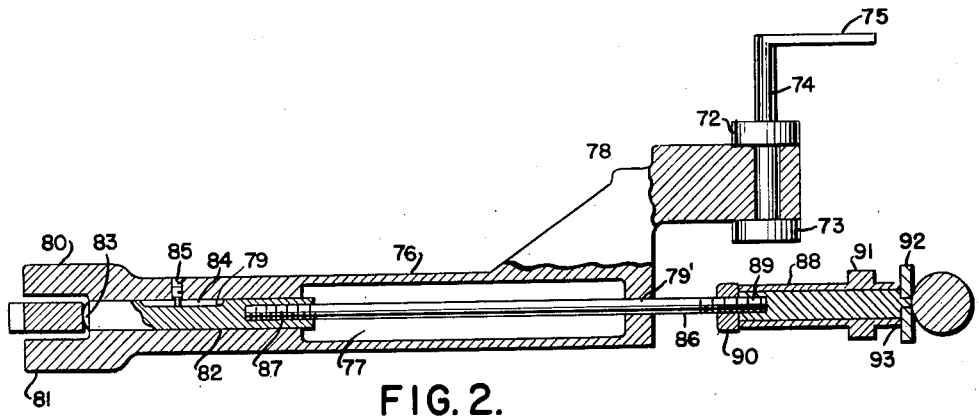
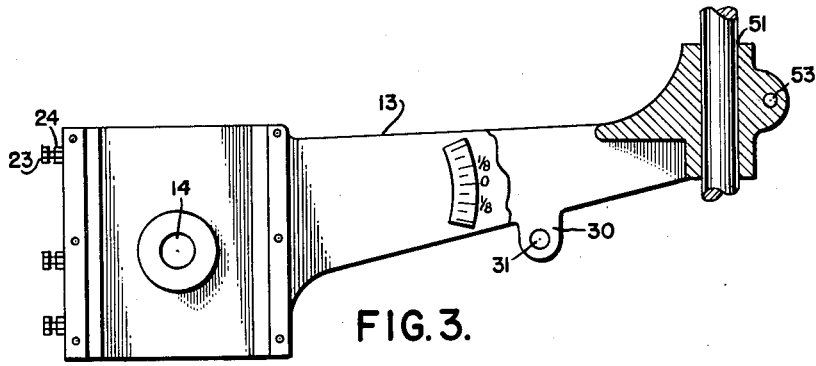
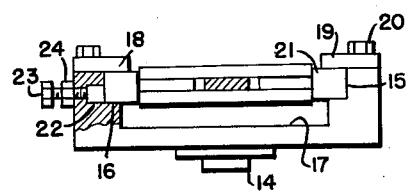
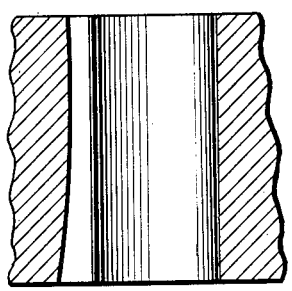

United States Patent Office 2,786,397
Patented Mar. 26, 1957

2,786,397

KEYSEATING MACHINE

William P. McIlvanie, Yakima, Wash.

Application January 13, 1953, Serial No. 331,063

4 Claims. (Cl. 90—45)

The present invention relates to machine tools, and more specifically pertains to a key-seating machine for cutting either straight or tapered key-ways.

One of the most common operations in machine shop practice is the cutting of a key-way. It is well known that key-ways can be cut on milling machines, shapers, or with other machines. However, it is often found desirable to utilize a machine especially adapted to the cutting of key-ways. The most acceptable machine for this purpose has been found to be one employing a longitudinally movable table and a vertically reciprocating broach. The broach is connected to a vertically movable cross-head driven by a connecting rod and fly wheel in a commonly known manner. Gears, collars, etc. which are to have a key-way formed therein can be slipped over the broach and clamped into position on the table. The broach is adjusted to a vertical position by means of a backup or positioning device. By reciprocation of the broach and advancement of the table, the key-way can be cut to the proper depth.

Often it is necessary to cut a tapered key-way. This can be accomplished with the broach type key-seating machine by slanting the broach to a position regulated by the backup device. However, when such is done, a true tapered key-way is not formed due to the fact that the broach is reciprocated vertically while it is inclined at an angle. As a result, the key-way which is cut has a curved base instead of a straight taper. The only way a straight taper can be obtained is by having the broach reciprocate directly in alinement with the cross head, and such does not occur when the broach is inclined at an angle to the cross-head.

To overcome the difficulty machines have been developed in which the broach will reciprocate in line with the cross-head when a taper key-way is being cut. This has been accomplished in the prior known machines by providing a table which can tilt. By tilting the table the work on which the taper is to be formed is tilted with respect to the broach, but the broach nonetheless will still move in a straight line vertically. Thus, a straight line cut will be formed in the work, and a true taper key-way can be achieved. The provision of a tilting table, however, adds considerably to the cost of the machine, due to the more complex nature of the table castings and the means for pivotally connecting the castings to the machine base or stand.

The use of a tilting table is also undesirable from a machinist's standpoint. When the table is to be tilted it is necessary to remove all tools and other loose devices so that they will not become deposited on the floor of the shop. Thus, calipers, micrometers, etc. as well as wrenches and hammers must be placed on a supporting means other than a key-seater table.

It is accordingly an object of this invention to reduce the cost of key-seating machinery and to overcome the objections from the machinist's standpoint mentioned above, as well as to improve the accuracy of the machine. As will be seen hereinafter, the present invention comprises a machine which does not have a tilting table yet in which the broach is reciprocated in line with the cross-head when cutting either tapered or straight key-ways.

In the instant machine the cross-head guide and attachments are tiltably mounted in the base. When a tapered key-way is to be cut, the work can be fastened on the table and the cross-head guide, cross-head and broach positioned at the proper angle to cut the desired tapered key-way. The setting-up time is reduced to a minimum and it is possible to leave tools and instruments on the work table at all times. The backup device for the broach is pivotally connected to the table and can be pivoted in accordance with the pivotal movement of the cross-head guides formed in the pivotally mounted structure within which the guides are maintained.

A further object of this invention is to provide a key-seating machine having a pivotally mounted cross-head guide with means for easily and accurately adjusting the pivotal position of the cross-head guides and also with means for insuring secure positioning thereof.

A further object of this invention is to provide a key-seating means having a pushing or backup device for a broach which functions in addition as a hold-down or clamping device for work.

Yet another object of this invention is to provide a pivotally mounted broach or backup and work hold-down device, with which accurate adjustment of the broach with respect to the line of movement of the cross-head can be attained.

Other objects and advantages of the invention will be appreciated by those skilled in the art upon consideration of the following description.

In the accompanying drawings:

Figure 2 is a sectional view taken along line 2—2 of Figure 1, and illustrating the construction of the work hold-down and broach backup post.

Figure 3 is an elevational view partly in section of the cross-head guide casting and associated elements.

Figure 4 is a sectional view of a hub, such as a gear hub, showing the objectionable curved key-way formed by a machine in which the broach alone is tilted with respect to the work in order to cut a tapered key-way.

Figure 5 is a view taken along line 5—5 of Figure 1 with some portions broken away.

Similar reference characters represent similar parts in the several figures.

Figure 1:
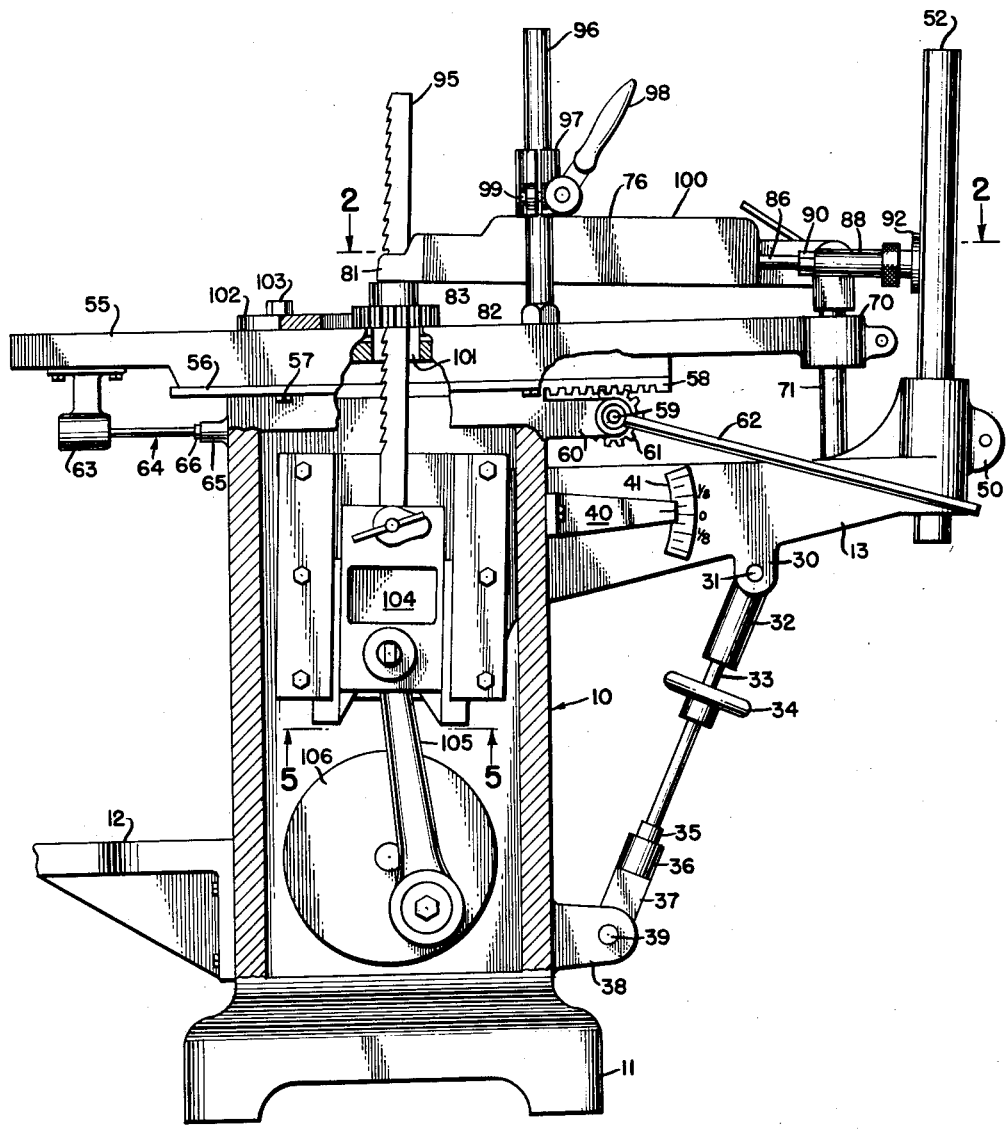
Figure 1 is a side elevational view partly in section of a key-seating machine constructed in accordance with the invention.

Referring now in particular to the drawings: 10 indicates the base or stand in which the cross-head, crank arm, fly wheel, etc. are mounted. The stand is provided with the usual legs 11. A platform 12 serves to support the motor used to power the machine. The cross-head guide casting 13, shown more fully in Fig. 3, is provided with a shaft 14 which may be connected thereto in any suitable manner. Shaft 14 is pivotally received within a suitable bearing mounted on the stand. Plane or anti-friction bearings may be provided. The guideways 15 and 16 are stepped above the base 17, as is common. Plates 18 and 19 are held in position by bolts 20 and serve to maintain the cross-head 21 in position. A gib 22 which can be adjusted by means of screw 23 and lock nut 24 is provided for taking up wear.

The cross-head casting has a depending fork comprising a pair of alined legs, one of which is indicated by numeral 30. The legs are adapted to receive a pin 31. Sleeve 32 is pivotally connected to pin 31 and has a threaded opening for receiving a cooperating threaded end of shaft 33. A hand wheel 34 is fixedly attached to shaft 33. Collar 35 is also securely fastened to shaft 33. The lower end of shaft 33 is rotatably received within sleeve 36 formed on lower support member 37, and is supported thereon by the collar. Support member 37 is pivotally connected to boss 38 by a pin 39. It is seen that by rotation of hand wheel 34, the cross-head guide casting 13 can be pivoted about its pivotal support on stand 10. Pointer 40 is secured to the stand and cooperates with a scale 41 attached to the cross head guide casting. The scale or angle gauge is calibrated in inches per foot, and in cooperation with pointer 40 gives a direct reading of the taper obtained through tilting the cross-head casting. It is understood that any desired calibration may be supplied.

At one end the cross-head casting is provided with a clamp 50 which is of the usual split type and may be integrally formed with the guide casting or attached thereto in any suitable manner. The clamp is formed with a vertically extending bore 51 in which pushing post 52 is received and clamped into position by means of bolt 53. Table 55 is supported on the stand on suitable ways and can be moved longitudinally along the stand.

Guide bars 56 may be fastened to the table by bolts 57 to prevent undesirable crosswise movement of the table. A rack 58 is secured to the bottom of the table and cooperates with a pinion 59 pivotally mounted in boss 60 by means of shaft 61. Lever 62 is fixedly connected to shaft 61 and can be used to advance the table on the stand. One end of the table is provided with a depending fixture 63 in which there is mounted a stop 64. Stop 64 cooperates with a projecting lug 65 and is provided with a hardened flange 66. The stop member is adjustably connected to fixture 63 and can be backed off from lug 65 so as to permit movement of the work against the broach. By operation of lever 62 the stop can be set in a manner commonly known so as to limit the depth of cut. For example, a micrometer type stop may be used.

At its other end table 55 is provided with a clamp 70 constructed similarly to clamp 50 and adapted to receive post 71. Clamp 70 can be tightened to the post 71 by means of a screw having a hand lever attached thereto, if desired. At its upper end post 71 is provided with a fork composed of legs 72 and 73 illustrated in Fig. 2. Legs 72 and 73 pivotally receive the combined broach backup and work hold-down device. A pin 74 having a lever 75 which may be conveniently grasped, provides the pivotal connection.

The work hold-down and broach backup device comprises a casting 76 having a central core 77 and an offset portion 78, which is pivotally connected to legs 72 and 73. The casting has longitudinally extending bores 79 and 79' and spaced fork elements 80 and 81. Broach backup 82 is slidably mounted in bore 79. Backup 82 is provided with a hardened tip 83 and a key-way 84. Set screw 85, which is threadingly mounted in the casting, seats in key-way 84 sufficiently to prevent rotation of backup 82, but permits movement thereof longitudinally of the casting. Push rod 86 is fastened to backup 82, as by threads 87. At one end the push rod is adjustably connected to sleeve 88 by means of threads 89 and nut 90. The sleeve has a knurled flange 91 which can be grasped to rotate the sleeve and adjust the position of the push rod 86 therein. Disk 92 is secured at one end of the sleeve 91. The disk may be fastened to the sleeve by means such as welds 93.

As illustrated in Fig. 1, when the combined work holddown and backup device is mounted in position, fork elements 80 and 81 bear on bushing 83 of the work 82. Also, the hardened end of broach backup 82 engages the broach 95 and circular plate 92 engages push post 52 when sleeve 88 is properly adjusted.

A hold-down device 96 which comprises a split collar and a flange having a longitudinally extending surface, is slidingly received on post 97. Post 97 is fastened to table 55. Lever 98, which is attached to screw 99, is used for tightening the split collar. The flange provided on hold-down device 97 extends above and is adapted to cooperate with the flat upper surface 100 on casting 76.

A suitable table opening 101 provides for operation of the broach in the table. Plate 102 and T bolts 103 may be used to hold the work in proper position. The broach itself is pivotally connected to cross-head 104 which is in turn pivotally connected to connecting rod 105 mounted on fly wheel 106.

The following description of the manner in which the machine is used will illustrate some of the advantages thereof.

When a straight key-way is to be cut, the hold-down device 97 is swung to one side and the backup and holddown casting 76 is swung upwardly out of the way. Next, the cross-head is adjusted until a zero reading on the scale is obtained and the work is placed in position by sliding down over the broach. Then when the holddown casting 74 is swung downwardly into position on the work, plate 92 is placed against pushing post 52, and the hold-down casting 76 is adjusted by means of post 71 until its upper surface lies in a longitudinal plane and is parallel to the table top. When this is done, plate 92 will abut push post 52 along a vertical line. Any misalinement can be readily seen by examining the contact between plate 92 and the pushing post. Post 71 is then clamped in position and clamping fixture 97 is moved down on top of casting 76 and clamped in position. The work having been previously brought up against plate 102, it is now held firmly in position on the table. A split bushing may be placed over the work, if desired. Casting 76 will then engage the bushing instead of the work and the broach can operate within the bushing opening formed by the split.

It should be noted that the teeth of the broach are such that the cut is on the down stroke and the force is downwardly and toward the left, as viewed in Fig. 1. After the hold-down casting 76 has been adjusted, push rod 86 is adjusted by means of sleeve 88 until broach 95 assumes a true vertical position. Nut 90 can then be brought up against sleeve 88 to lock the push rod and backup in position. Stop 64 can be adjusted as desired and the work can be advanced by means of lever 62. It is seen that the machine will cut a straight key-way.

To cut a tapered key-way the same operations as described above are performed. The work 83 is positioned as above and casting 76 is swung down onto the work. Next, the cross-head casting is adjusted by means of the hand wheel 34 until the proper scale reading is obtained for the desired taper. Then casting 76 is adjusted until plate 92 squarely abuts push post 72 and clamp 70 is tightened.

The adjustment of casting 76 is done with forks 81 and 82 resting on work 83. After the above adjustment holddown device 97 is clamped in position on casting 74. Push rod 86 is then adjusted by rotation of sleeve 88 until broach 95 is parallel to push post 52. The machine is now ready to cut a true tapered key-way. As the table is advanced during cutting operation, plate 92 and the hardened end of push bar 82, slide upwardly on the push post and broach, respectively.

Figure 4 illustrates the curved keyway which is formed when the broach does not reciprocate in line with the cross-head. With my machine this does not occur and a true taper key-way is formed.

From the foregoing description it will be apparent that I have devised a key-seating machine which will cut a true taper key-way, but which is less complicated and easier to use than previously known key-seating machines.

While I have shown and described a preferred form of my invention, it will be understood that variations in details of form may be made without departure from the invention, as defined in the appended claims.

I claim:

1. A key-seating machine comprising a reciprocating member having a broach attached thereto, a table, means pivotally connecting said member to said table, a backup device for said broach comprising a push post fixedly connected to said means, a second member pivotally connected to said table, and an adjustable means mounted in said second member extending between said broach and said push post.

2. A machine tool comprising a frame, a reciprocating cross-head having a cutting tool affixed thereto, a table, a backup device for said tool comprising a pivotally mounted member pivotally connected to said table having a movable backup means mounted therein, a second pivotally mounted member pivotally mounted on said frame, an adjustable means extending between said last named backup means and said second pivotally mounted member of said machine against which said means exerts pressure during adjustment of said tool, said second pivotally mounted element comprising means for guiding reciprocal movement of said cross-head.

3. A machine tool, comprising a tool member and a combined work hold-down and tool backup device including an element pivotally connected to said machine and adapted to engage work being operated on by said tool including a backup member mounted in said element extending between a portion of said machine and said tool, and a hold-down clamp adapted to engage said element and maintain it in engagement with said work, said portion of said machine constituting a guide for a reciprocating member, and said reciprocating member being connected to said tool for operation thereof.

4. In a machine tool, a table, means for adjusting a cutting tool comprising a member connected to said table having a longitudinal bore, spaced fork elements projecting beyond the extent of said bore at one end of said member and defining a slot alined with said bore, a push rod mounted in said bore and projecting beyond the opposite end of said member and having one end adapted to engage a tool received between said fork elements, a post pivotally connected to said table at its opposite end said push rod being adapted to abut against said post, and means for adjusting the length of said push rod.

References Cited in the file of this patent
UNITED STATES PATENTS

| | | |
|---|---|---|
| 221,480 | Trevor | Nov. 11, 1879 |
| 289,060 | Bonds | Nov. 27, 1883 |
| 388,946 | Benson | Sept. 4, 1888 |
| 1,438,324 | Miller | Dec. 12, 1922 |
| 2,084,061 | Morton | June 15, 1937 |